United States Patent [19]

Tripodi

[11] Patent Number: 5,195,012
[45] Date of Patent: Mar. 16, 1993

[54] ELECTRONIC TRIP DEVICE COMPRISING AN IMPROVED LONG DELAY FUNCTION

[75] Inventor: Paul Tripodi, Eybens, France

[73] Assignee: Merlin Gerin, Meylan, France

[21] Appl. No.: 719,186

[22] Filed: Jun. 21, 1991

[30] Foreign Application Priority Data

Jul. 3, 1990 [FR] France ............................. 90 08527

[51] Int. Cl.⁵ .............................................. H02H 3/08
[52] U.S. Cl. ......................................... 361/94; 361/96
[58] Field of Search .................... 361/94, 96, 87, 103, 361/24; 364/50, 483

[56] References Cited

U.S. PATENT DOCUMENTS 4,445,183 4/1984 McCollum et al. ................. 364/483
4,717,985 1/1988 Demeyer ................................ 361/96

FOREIGN PATENT DOCUMENTS

2540303 8/1984 France.

Primary Examiner—A. D. Pellinen
Assistant Examiner—S. Jackson
Attorney, Agent, or Firm—Parkhurst, Wendel & Rossi

[57] ABSTRACT

To perform the long delay function of an electronic trip device, a quantity (TLR1) representative of the thermal current state varies proportionally to the difference ($I^2 - I_s^2$) between the square of a value (I) representative of the current flowing in a conductor to be protected and the square of a current threshold (Is). This first quantity (TLR1) is used in combination with a second value (TLR2) to produce a tripping signal when the second value exceeds a preset value (TLR2max). The second quantity preferably increases proportionally to the square ($I^2$) of the value representative of the current, when the first quantity exceeds a preset threshold (STLR1) and decreases, preferably exponentially, when the first quantity is lower than this threshold.

7 Claims, 9 Drawing Sheets

ELECTRONIC TRIP DEVICE COMPRISING AN IMPROVED LONG DELAY FUNCTION

BACKGROUND OF THE INVENTION

The invention relates to an electronic trip device comprising detection means for detecting the current flowing in a conductor designed to be protected by an electrical circuit breaker associated with the trip device, an electronic processing unit performing at least a delayed tripping function of the long delay type, the assembly, connected to the detection means, comprising means for producing a value representative of the current, means for producing a first quantity, representative of the thermal state of the circuit breaker, the variations of which are proportional to the difference between the square of the value representative of the current and the square of a preset current threshold, and means for comparing the first quantity to a preset first threshold.

In most state-of-the-art electronic trip devices, the time delay of the long delay function is inversely proportional to the square of the fault current. These trip devices also take account of a possible decrease of the current, dropping below the current threshold, during the time delay. In a conventional manner (FIG. 1), when the value I representative of the current is greater than the current threshold Is, the quantity TLR representative of the thermal state of the circuit breaker, initially set to a minimum value, 0 in the figure, increases proportionally to the square of the current, simulating heating, whereas, when the value I representative of the current is lower than the current threshold Is, the quantity TLR decreases exponentially with time, simulating cooling. A tripping signal is produced when the quantity TLR exceeds a preset maximum value TLRmax.

It can be noted that, in some cases, a tripping signal is produced, although the mean value of the value representative of the current, during the time delay period, remains lower than the tripping threshold. This has, for the user, the same consequences as a decrease of the tripping threshold.

SUMMARY OF THE INVENTION

The object of the invention is to overcome this type of drawback and to provide the trip device with an improved long delay function.

Figure 1:
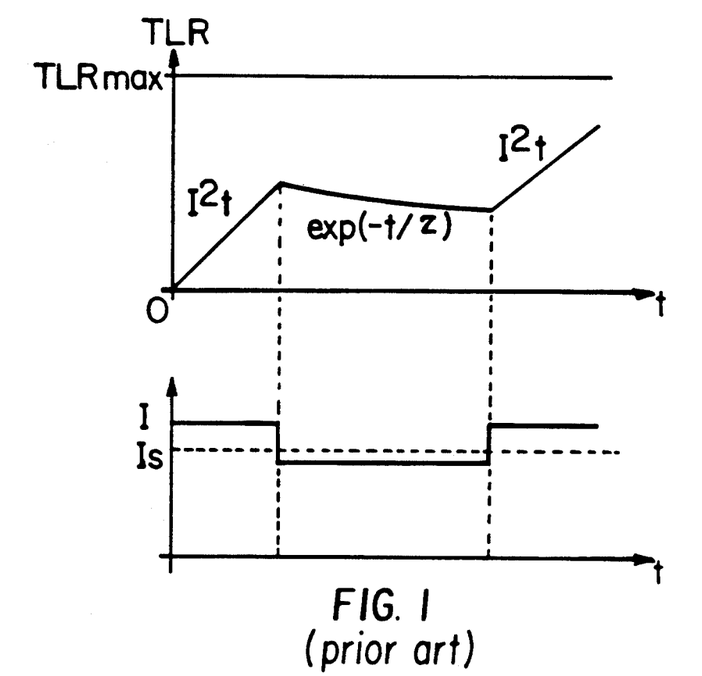
FIG. 1 illustrates the variations, with respect to time, of the value representative of the current and of a quantity representative of the thermal state of the circuit breaker in a conventional electronic trip device.

By analyzing the variations of TLR with respect to time in FIG. 1, it can be noted that there is no homogeneity between the heating and cooling simulations. As an example, conventional values of the current threshold Is, heating curve and cooling time constant are given by:

Is = 1.05 to 1.20 Ir, Ir being the trip device adjustment current.

The curve $I^2t$ = constant is such that t = 15 to 480 s, for example, 110 s for I = 1.5 Ir.

The cooling time constant is in the order of 30 minutes.

This leads to a dissymmetry of the heating and cooling functions and to great account being taken of slight overshoots of the current threshold Is by the value I representative of the current.

In U.S. Pat. No. 4,445,183, the variations of the first quantity are proportional to the difference between the square of the value representative of the current and the square of the current threshold.

The fact of considering the current threshold as a balance point, from which the current varies, corresponds to averaging the current variations around this threshold and taking into account in the same way the current variations under and above the threshold. By means of this symmetry, a value representative of the current whose mean value, during the time delay, is lower than the threshold, can not give rise to tripping, even if this value provisionally reaches values higher than the threshold.

If, as in U.S. Pat. No. 4,445,183, the assembly produces a tripping signal when the first quantity is greater than said first threshold, the tripping curve obtained is close to that of a fuse or bimetal strip.

According to the invention, the assembly comprises means for incrementing a second quantity representative of the thermal state of the circuit breaker when the first quantity is greater than the first threshold, means for decrementing the second quantity when the first quantity is lower than the first threshold, and means for comparing the second quantity to a second, preset threshold, producing a tripping signal when the second quantity is greater than the second threshold.

In this case, the homogeneity principle is only used for small variations of the quantity representative of the current. The tripping curve is then essentially determined by the type of variations of the second quantity. A curve close to conventional $I^2t$ curves is obtained if the incrementation of the second quantity is proportional to the square of the value representative of the current and its decrementation is an exponential function of time.

The first quantity is preferably limited to preset high and low levels. This makes it possible to determine the inertia of the long delay function to small variations and the precise shape of the tripping curve.

In practice, the value of the first and/or second quantities representative of the thermal state of the circuit breaker is not determined continuously, but on each collection of a value representative of the current.

In microprocessor-based trip devices, this collection is generally performed by sampling of the output signal from the current detection means. In some trip devices, said signal is applied to a rectifier and peak detection circuit before being sampled. Each sample, for example each sample representative of the peak value of the current, can be used, according to the invention, to determine the corresponding variation of the first and/or second quantities representative of the thermal state of the circuit breaker. Small variations in the amplitude of the signal are thus not taken into account, and tripping does not take place so long as the mean value of the sampled current value, during the time delay, for example its peak value, remains lower than the tripping threshold.

According to a preferred embodiment, the value representative of the current is representative of the rms value of the current, and is obtained by sampling of the output signal from the detection means, squaring of the samples and integration over a preset integration period. Such a value depends to a very great extent on the frequency variations of the mains system supplying the conductor to be protected, and may lead to nuisance tripping in electronic trip devices of the conventional type. The invention, implemented in a trip device sensitive to the rms value of the current, enables the problem of these frequency variations to be overcome to a large extent.

To improve the independence of the long delay function with respect to the mains frequency even further, notably for high frequencies, the output signal from the detection means is sampled in successive groups of "n" samples with a preset sampling period, the adjacent samples of two successive groups being separated by a period slightly greater than the sampling period. In a preferred embodiment, the period separating adjacent samples of two successive groups is equal to the sampling period increased by a quarter of the sampling period.

In order to overcome harmonics, according to a development of the invention the output signal from the detection means is sampled in successive groups of n samples with predetermined sampling periods (Te1--Te4), different for two successive groups.

The samples then preferably constitute cycles of q successive groups, with an identical succession of the sampling periods (Te1-Te4) within a cycle.

BRIEF DESCRIPTION OF THE DRAWINGS

Other advantages and features will become more clearly apparent from the following description of illustrative embodiments of the invention, given as non-restrictive examples only and represented in the accompanying drawings, in which.

DESCRIPTION OF THE PREFERRED EMBODIMENT

Figure 2:
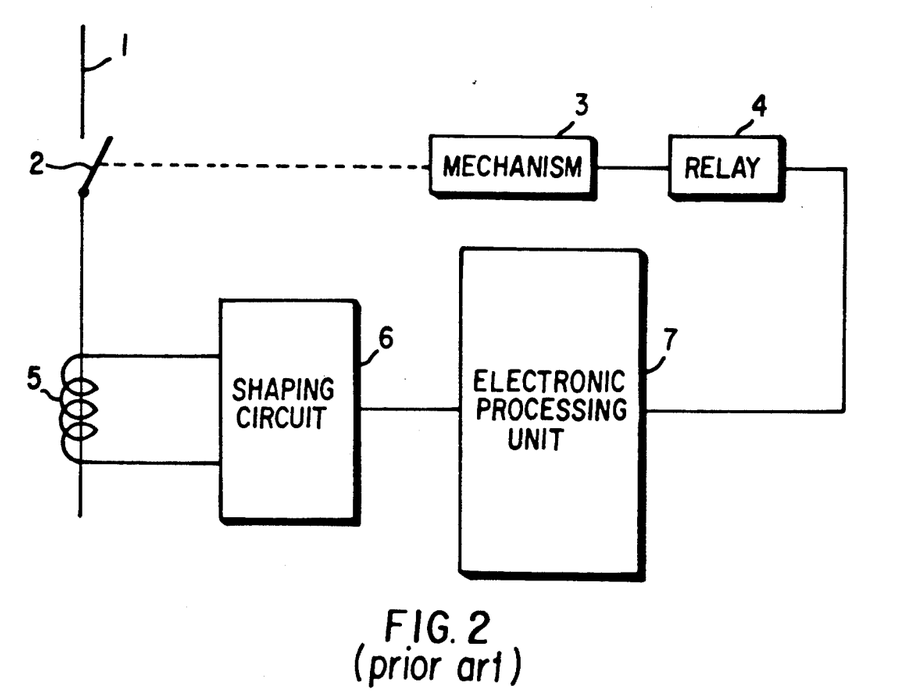
FIG. 2 represents a simplified block diagram of a state-of-the-art trip device in which the invention can be implemented.

In FIG. 2, a conductor 1 of an electrical mains system is protected by a circuit breaker 2. The mechanism 3 of the circuit breaker 2 is controled by a polarized relay 4 ordering tripping of the circuit breaker in the event of an overload or short-circuit. A current transformer 5, associated with the conductor 1, delivers an analog signal representative of the current flowing in the conductor. This signal is applied, via a shaping circuit 6, to an electronic processing unit 7 whose output controls the polarized relay 4. The trip device performs at least a long delay function, well-known to those specialized in the art, when a fault occurs in the conductor.

Is being the current threshold giving rise to tripping when it is exceeded, the variations of a quantity TLR1, representative of the thermal state of the circuit breaker, are proportional to the difference $I^2-Is^2$, between the square of the value representative of the current and the square of the current threshold.

On each collection by the electronic processing unit of a value I representative of the current, this unit determines a new value of the quantity TLR1, such that:

$$TLR1n = TLR(n-1) + (I^2 - Is^2) \tag{1}$$

the quantity TLR1 being initially set to low level, preferably zero.

A tripping signal can be produced on output of the unit 7 when the quantity TLR1 is greater than a preset value TLR1max.

Figure 3:
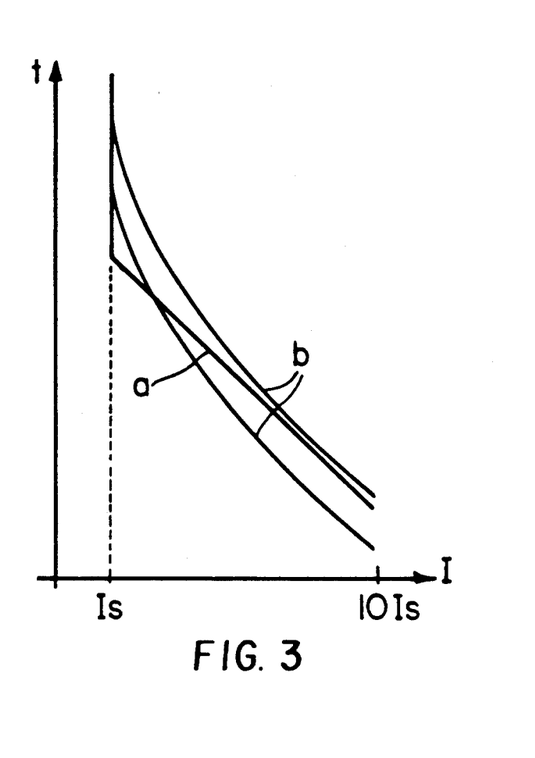
FIG. 3 illustrates the long delay tripping curves of a conventional trip device (curve a) and of an alternative embodiment using the current threshold as balance point (curves b).

Curve a in FIG. 3 represents, in logarithmic coordinates, the long delay tripping curve of a conventional trip device, curves b illustrating tripping curves, of the $(I^2-Is^2)$ t=constant type, obtained by varying the quantity TLR1 according to the equation (1), for two different values of the value TLR1max. Unlike curve a, curves b are rounded at the level of the threshold current Is, which is advantageous.

Figure 4:
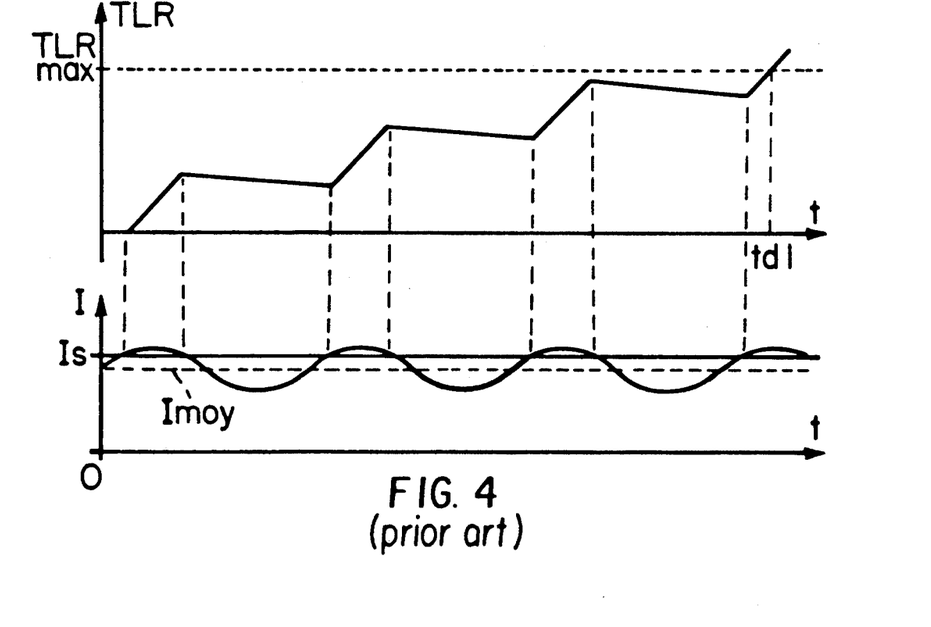
FIGS. 4 to 6 represent the variations with respect to time of a quantity representative of the thermal state of the circuit breaker and of the value representative of the current, respectively for a conventional long delay function (FIG. 4), and for a long delay function according to curves b of FIG. 3 (FIGS. 5 and 6).

FIG. 4 illustrates the variations, versus time, of TLR for a conventional long delay function, of the same type as in FIG. 1, when the value I representative of the current oscillates periodically around a mean value Imoy lower than the current threshold Is. The dissymmetry of the heating and cooling functions implies taking great account of the overshoots of the threshold Is by the value I, leading to tripping at a tripping time td1, when TLR reaches TLRmax, although the mean value of I remains constantly lower than the current threshold Is.

Figure 5:
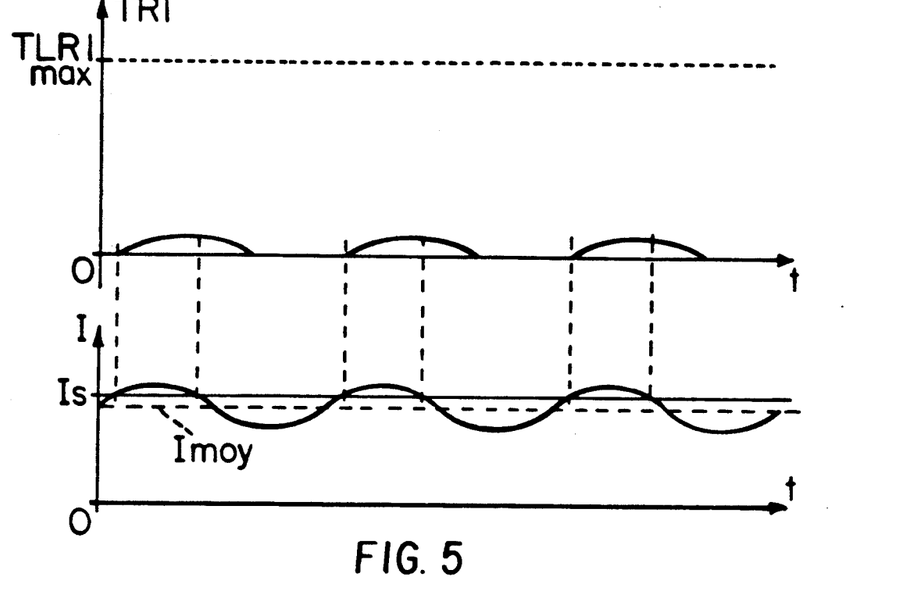
Figure 6:
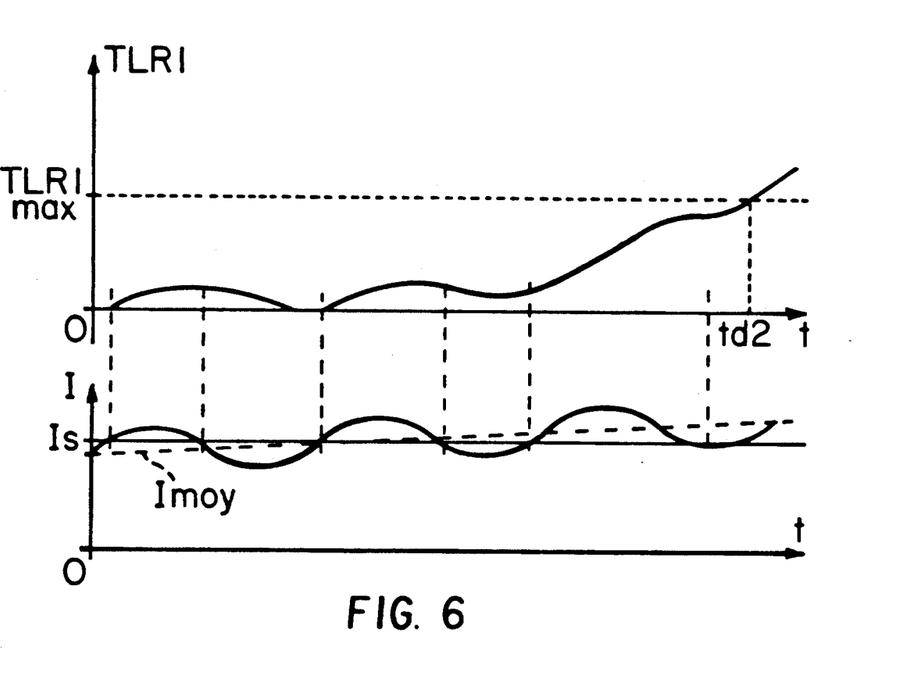

The same periodic oscillation of I around a mean value Imoy lower than the current threshold Is does not however lead to tripping if the variations of TLR1 are proportional to the difference between the square of I and the square of Is. Indeed, as represented in FIG. 5, the quantity TLR1, which can not be lower than a preset low value, zero in the figure, taking into account in the same way the values greater and lower than Is, returns to zero before the end of each variation period of I and can not reach the value TLR1max which would give rise to tripping. This variation law of TLR1 nevertheless gives rise to tripping (td2) if the mean value Imoy of the current exceeds the tripping threshold Is for a sufficiently long time (FIG. 6).

According to the invention, the quantity TLR1 is combined with another quantity TLR2 representative of the thermal state of the circuit breaker. This quantity TLR2 has, like the quantity TLR of conventional long delay functions, a positive variation, preferably proportional to $I^2$, to simulate heating, and a negative variation, preferably exponential, to simulate cooling. However, unlike the conventional quantity TLR (FIGS. 1 and 4), switching between the heating and cooling functions of the quantity TLR2 is not directly linked to the comparison of the value I with the current threshold (Is), but with the comparison of the quantity TLR1 to an intermediate heating threshold STLR1.

Figure 7:
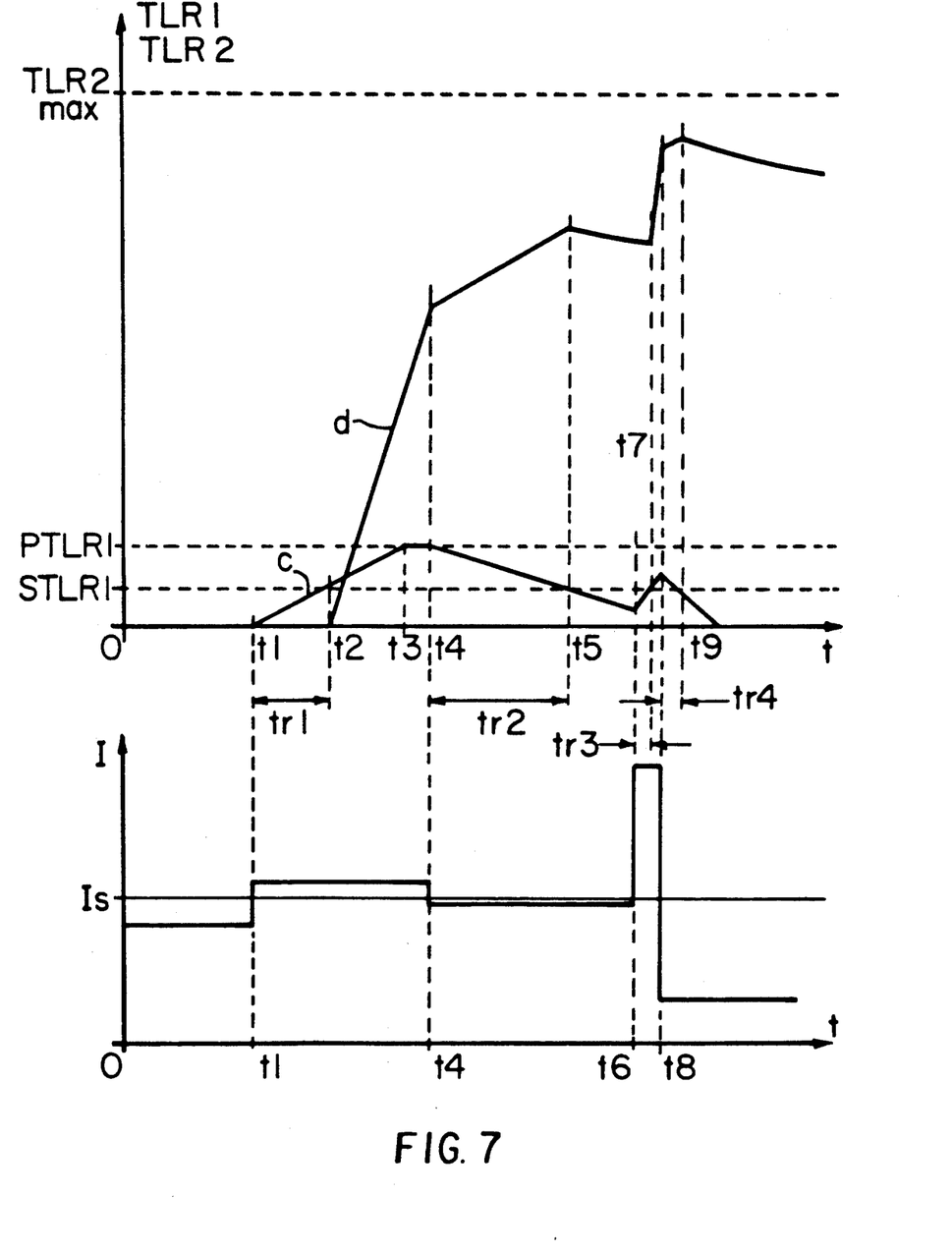
FIG. 7 illustrates the variations with respect to time of two quantities representative of the thermal state of the circuit breaker and of the value representative of the current for a long delay function according to the invention.

FIG. 7 represents the variations versus time of TLR1 (curve c) and TLR2 (curve d) for various relative values of I and Is:

Up to the time t1, I is less than Is, the quantities TLR1 and TLR2, nil at the outset, remain at zero.

At the time t1, I goes over Is, TLR1 then increases proportionally to $I^2 - Is^2$.

Between the times t1 and t2, TLR1 remaining less than STRL1, TLR2 remains at zero.

At the time t2, TLR1, which continues to increase, reaches the threshold STLR1, and leads the quantity TLR2 to simulate overheating. TLR2 increases according to $I^2 t$.

In the embodiment represented, the quantity TLR1 has a maximum limit of a high level PTLR1. When it reaches this value, at the time t3, it remains equal to this value so long as I is greater than Is.

At the time t4, I becomes slightly lower than Is again, and TLR1 decreases. The difference $I^2 - Is^2$ being, in absolute value, slightly smaller after the time t4 than between the times t1 and t3, the decrease of TLR1 after the time t4 is less fast than its increase between the times t1 and t3. Up to the time t5, TLR1 remains greater than STLR1 and TLR2 continues to simulate overheating, and therefore to increase proportionally to $I^2$. The value of I between t4 and t5 being lower than its value between t1 and t4, the increase of TLR2 is then less fast than before.

When TLR1 drops below STLR1, from t5, TLR2 simulates cooling and decreases exponentially.

At the time t6, I becomes greater than Is. TLR1 then increases quickly and reaches the threshold STLR1 at the time t7. Between t6 and t7, TLR2 continues to decrease exponentially.

From t7, TLR2 increases very quickly up to the time t8 when I becomes smaller than Is again.

From t8, TLR1 decreases proportionally to the difference $I^2 - Is^1$, i.e. fairly quickly in the example represented in the figure, I then being much lower than Is. TLR1 remains greater than STLR1 up to the time t9. Between t8 and t9, TLR2 continues to increase, but less quickly than between t7 and t8 as I is much weaker.

From t9, TLR2 starts to decrease exponentially again.

In FIG. 7, TLR2 remains lower than a maximum value TLR2max, no tripping signal is emitted.

The quantity TLR2 only simulates heating or cooling with a certain delay with respect to time when the value I becomes respectively greater or smaller than the current threshold Is. In the figure, the time delay on heating is represented by tr1, between the times t1 and t2, and tr3 between the times t6 and t7, the time delay on cooling corresponding to tr2 between the times t4 and t5 and tr4 between the times t8 and t9. This inertia on heating and cooling depends on the level of the value I representative of the current with respect to the current threshold Is. The value I being much greater than the threshold between t6 and t8, the time delay tr3 on heating is much shorter than the time delay tr1 on heating corresponding to a smaller overshoot of the threshold Is by the value I from the time t1.

As in the alternative embodiment described with respect to FIGS. 5 and 6, a value representative of the current whose mean value is lower than the threshold during the time delay will not result in tripping. The inertia on heating of the quantity TLR2 resulting from the use of the quantity TLR1 prevents any increase of TLR2 so long as TLR1 has not exceeded the threshold STLR1. The choice of the threshold STLR1 enables the shape of the tripping curve to be adjusted. In order to achieve a symmetrical inertia on heating and cooling, the threshold STLR1 should preferably be chosen equal to PTLR1/2, as represented in FIG. 7. FIGS. 5 and 6 apply to the variations of TLR1 according to the invention, if TLR1max is replaced by STLR1. In FIG. 5, the variations of I around Imoy, lower than Is, are insufficient for TLR1 to exceed STLR1 and TLR2 is not activated. In FIG. 6, Imoy becoming greater than Is, TLR1 increases continuously, and when TLR1 reaches the threshold STLR1, TLR2 starts simulating heating. If the latter continues for a sufficient length of time, TLR2 will reach TLR2max and give rise to tripping.

Figure 8:
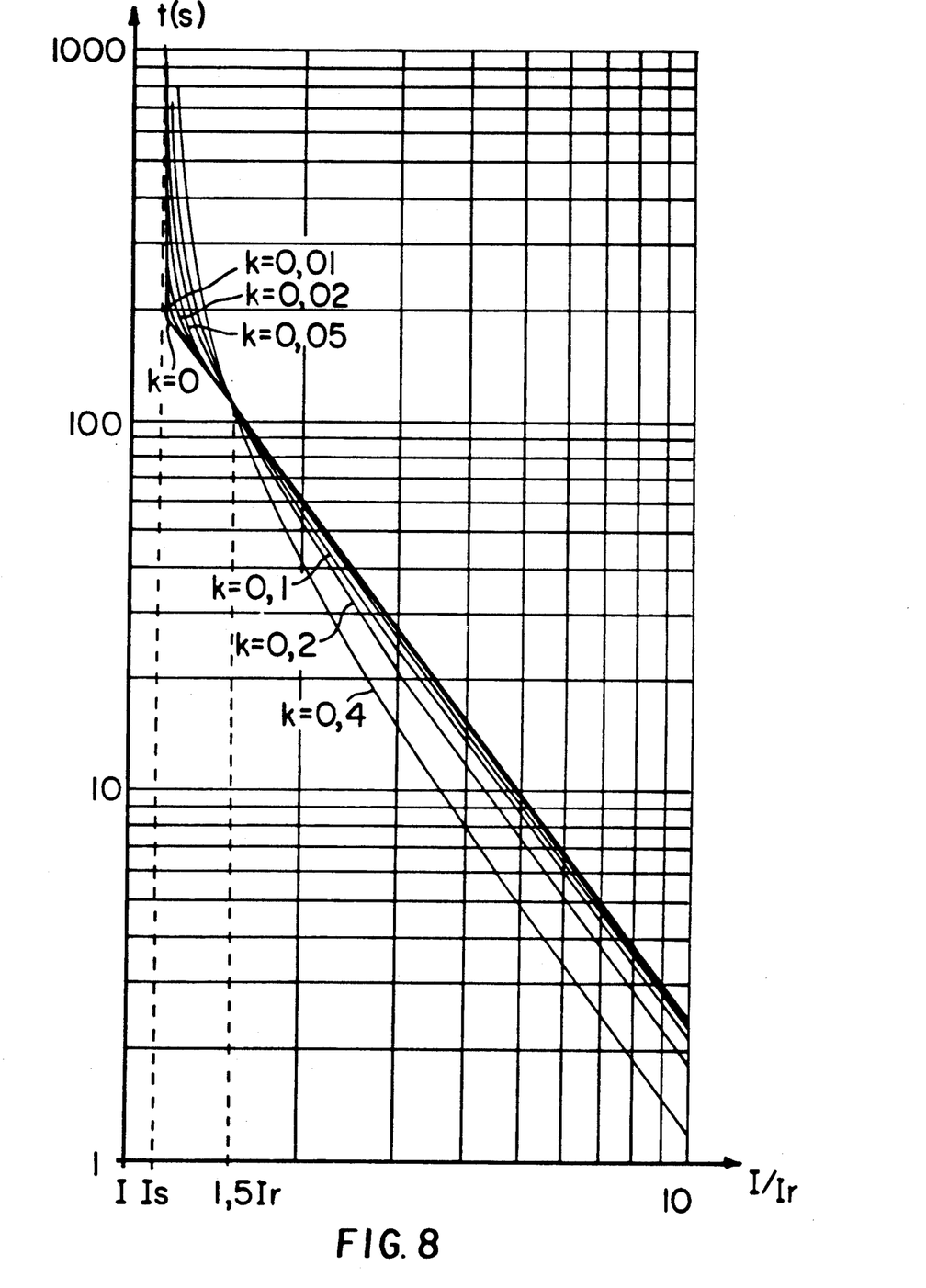
FIG. 8 illustrates the long delay tripping curves of a trip device according to the invention.

FIG. 8 illustrates various tripping curves of a long delay function according to the invention.

A variable $k = STRL1/TLR2max$ is significative of the inertia introduced into the long delay function by the quantity TLR1 for small variations of the value representative of the current around the current threshold Is. When $k=0$, the tripping curve represented in FIG. 8 corresponds to the conventional long delay tripping curve represented by a in FIG. 3. FIG. 8 represents the tripping curves obtained with various values of k, for a same value of TLR2max. It can be noted that when STLR1 is equal to 1% or 2% of TLR2max ($k=0.01$ or $0.02$), the tripping curve is very close to a conventional tripping curve over a large part of the curve, while being well rounded in proximity to the tripping threshold.

Figure 9:
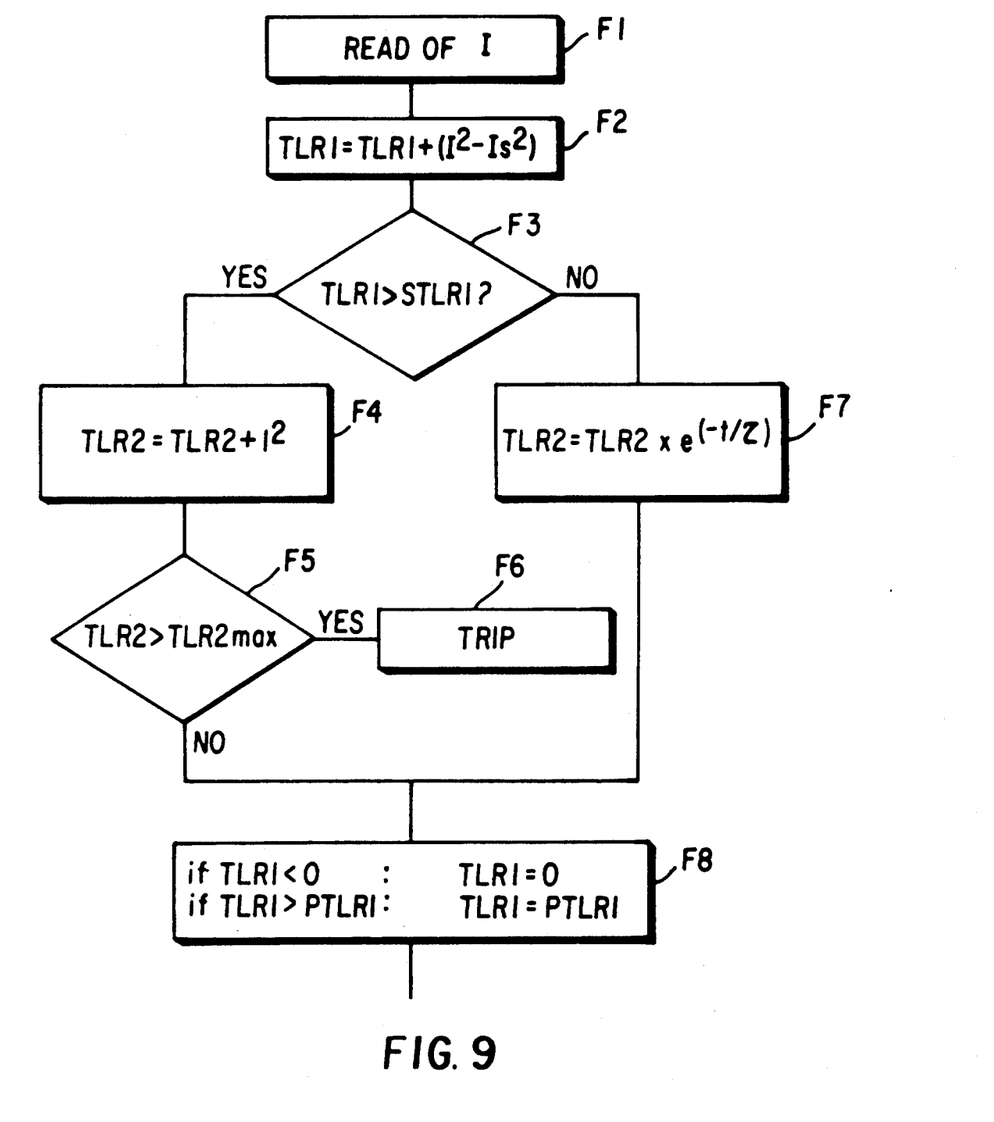
FIG. 9 represents the flow chart of the long delay function according to the invention.

According to a preferred embodiment, the electronic processing unit 7 comprises a microprocessor and the long delay function is performed according to the flow chart represented in FIG. 9.

After each collection of a value I representative of the current (stage F1), the quantity TLR1 is recomputed (F2), then (F3) compared with the threshold STLR1. If TLR1 is greater than STLR1, the square of the value I is added to TLR2 (F4) and the new value TLR2 is compared with TLR2max (F5). If TLR2 is greater than TLR2max, a tripping order is produced (F6). If (F3) TLR1 is lower than STLR1, TLR2 is reduced according to an exponential function (F7). At the end of the cycle (F8), if TLR1 is less than zero, TLR1 is zero reset, and if TLR1 is greater than PTLR1, it is limited to this value for the next cycle. This limiting of TLR1 to high and low values could possibly be performed between stages F2 and F3.

Variations of the value representative of the current around a mean value, such as those represented in FIGS. 4 to 6 for example, and whose influence on the long delay function is eliminated by means of the present invention, can have numerous causes. In the case of digital trip devices, it can be shown that the use of a value I representative of the rms value of the current, obtained by sampling of the output signal from the detection means, raising to the square and integration over a preset integration period, results in a value I of this type being obtained, oscillating periodically around the actual rms value of the current as soon as the current frequency varies.

Figure 10:
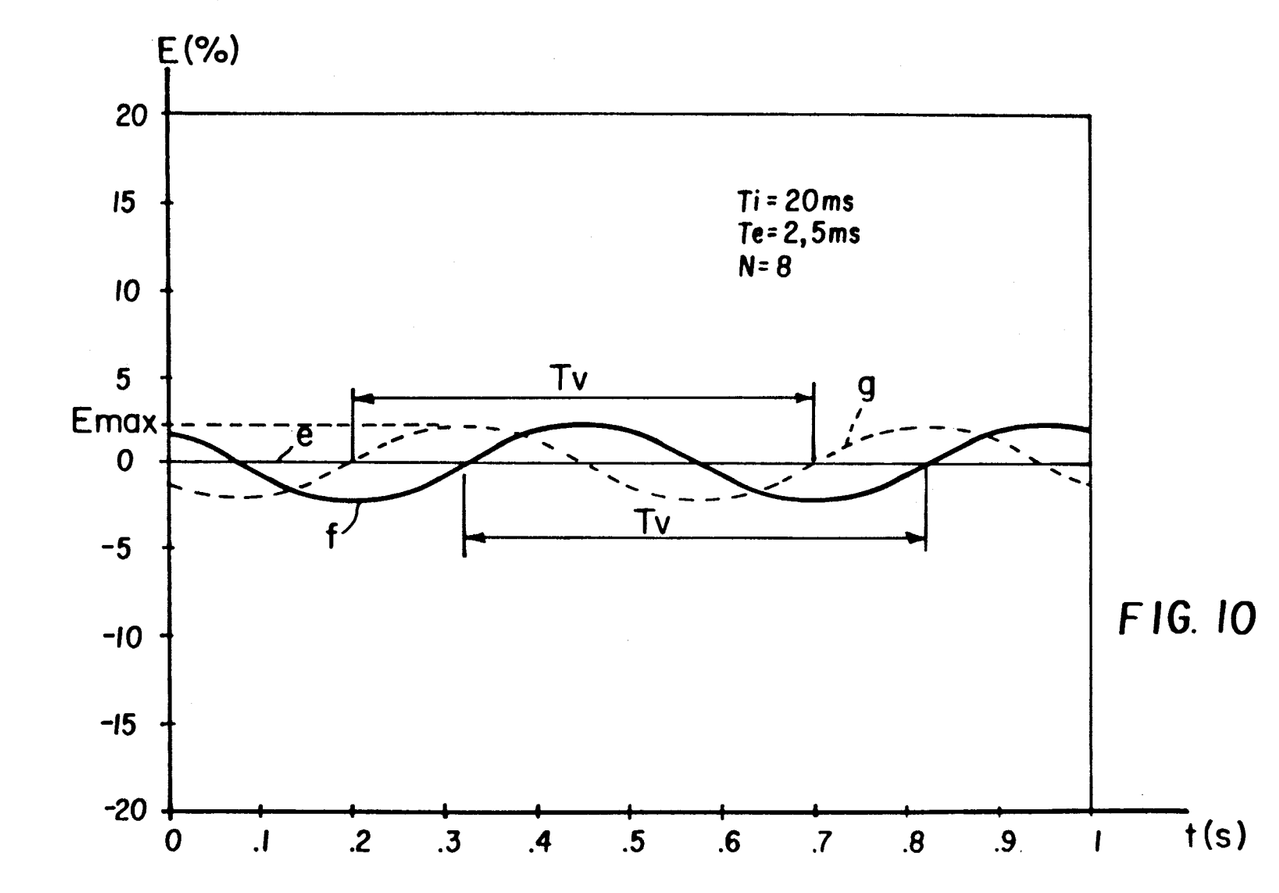
FIG. 10 illustrates the difference between the square of the computed rms value and the square of the actual rms value of a sinusoidal signal with a frequency of 50 Hz (curve e), 49 Hz (curve f) and 51 Hz (curve g).

FIG. 10 illustrates, as an example, for three different frequencies, the variation with respect to time of the difference E, in percentage, between the square of the computed rms value and square of the actual rms value of a pure sinusoidal signal sampled with a sampling period Te=2.5 ms and integrated over an integration period Ti=20 ms, i.e. over a number N of 8 samples. Whereas for a frequency of 50 Hz (curve e) the difference E is nil, a frequency variation of 1 Hz results in a non-negligible difference, of nil mean value, varying sinusoidally with a period Tv of 0.5 s (curves f and g).

Figure 11:
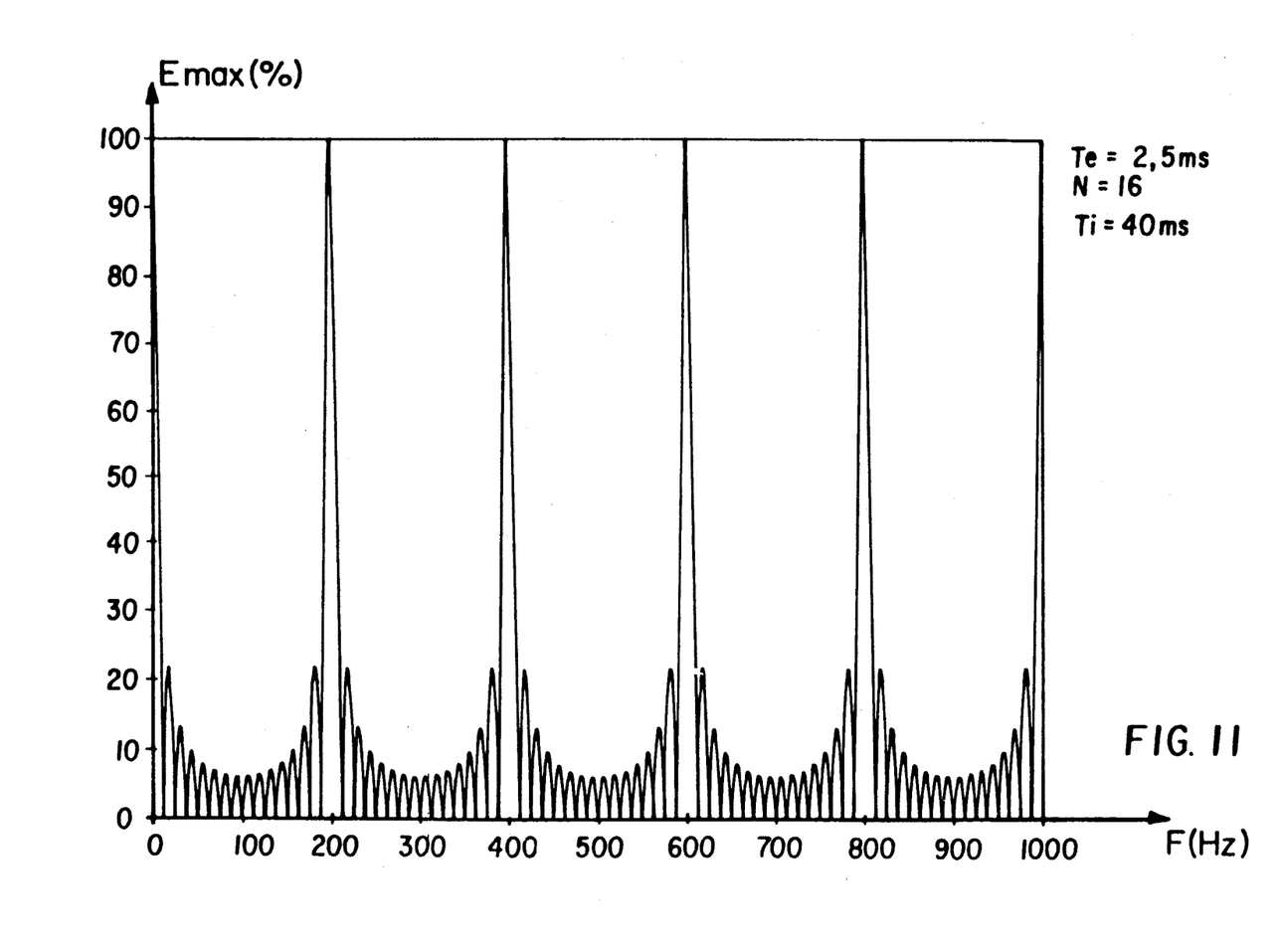
FIG. 11 represents, with respect to the frequency, the maximum difference between the square of the computed rms value and the square of the actual rms value of a sinusoidal signal.

FIG. 11 represents, in percentage, the maximum difference Emax, in absolute value, corresponding to the peak value of the difference represented in FIG. 10, obtained when the square of the rms value of a sinusoidal signal of frequency F is computed, with a sampling period Te=2.5 ms and an integration period Ti=40 ms, i.e. with a number N of 16 samples for each collection of the value I. This curve presents a succession of lobes, the maximum difference varying very greatly with the frequency according to the relative values of the sampling period, the integration period and the signal period. The main lobes, where the maximum difference reaches 100%, correspond to very low frequencies (less than 12.5 Hz in FIG. 11) when the integration period becomes smaller than the signal half-period, as well as to the signals whose period is equal to twice the sampling period or to a multiple of this value (in the figure, frequency signals of 200 Hz, 400 Hz, ...).

Away from these main lobes, the maximum difference is nil when the integration period is an integer multiple of the signal half-period and increases to form intermediate lobes when it moves away from these values. The variation period Tv of the difference E is greater the smaller the maximum difference Emax, and in all cases the mean value of the difference E tends to zero.

The invention described above, by eliminating the influence of the variations of the value representative of the current around a mean value, enables the trip device to be rendered practically insensitive to numerization errors due to the choice of the integration period with respect to the mains frequency and, for preset sampling and integration periods, enables it to be rendered insensitive to mains frequency variations. All the intermediate lobes can be eliminated by implementing the invention under the sampling and integration conditions represented in FIG. 11.

To improve the independence of the long delay function with respect to the mains frequency, notably for high frequencies corresponding to the main lobes represented in FIG. 11, according to a preferred embodiment, the signal is sampled in successive groups of 4 samples with a sampling period Te, the adjacent samples of two successive groups being separated by Te+Te/4.

To improve the independence of the measurement with respect to the mains frequency harmonics, another embodiment consists in sampling the output signals from the detection means in successive groups of n samples, the sampling periods of two successive groups being different. As an example, a cycle of four groups of 64 samples can, for a mean sampling period Te, be performed as follows:

first group G1 of 64 samples: Te1=63/64 Te;
second group G2 of 64 samples: Te2=65/64 Te;
third group G3 of 64 samples: Te3=62/64 Te;
fourth group G4 of 64 samples: Te4=66/64 Te;
The succession of groups is as follows:
G1, G2, G3, G4, G1, G2 ...

In a preferred embodiment, within a cycle of q groups (for example 4), the values of the sampling period (Te1, Te2; Te3, Te4) are distributed symmetrically with respect to a mean value (Te) of the sampling period.

The different values of the sampling periods are chosen in such a way as to have maximum covering of the signal in the shortest possible time while remaining independent from the mains frequency.

The number n of samples of a group is independent from the number of samples taken into account during an integration period Ti.

Figure 12:
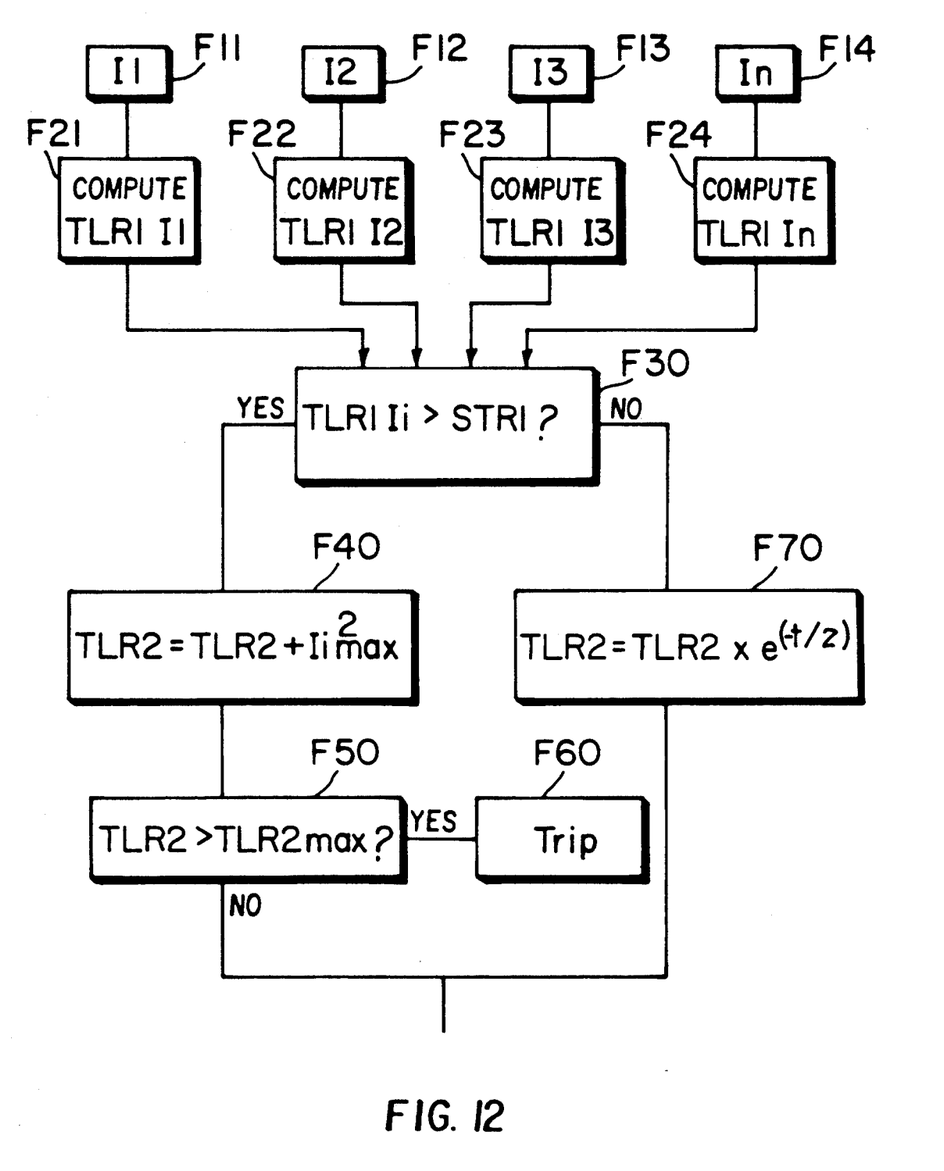
FIG. 12 represents a flow chart of the same type as that according to FIG. 9, applied to a multipole trip device.

The invention applies not only to a single-phase trip device, but also to a multipole trip device. It is then indispensable to separate processing of the currents of the different phases for collection of the values Ii, for example I1, I2, I3 and In for a trip device with three phases and neutral, representative of the current in the different phases and computation of associated quantities TLR1 Ii, as shown in FIG. 12 (stages F11 to F14 and F21 to F24). However, a single quantity TLR2 can be used. In this case, the quantities TLR1 Ii are compared to the threshold STLR1 (F30) and if at least one of them is greater than the threshold, TLR2 is increased by the square of the maximum value Iimax representative of the currents (F40) before being compared to TLR2max (F50), so as to produce a tripping signal (F60) if TLR2 is greater than TLR2max. If none of the quantities TLR1 Ii is greater than STLR1, the quantity TLR2 is decremented exponentially (F70).

I claim:

1. An electronic trip device comprising:
   detection means for detecting a current flowing in a conductor protected by an electrical circuit breaker and generating an output signal indicative thereof;
   an electronic processing unit for performing at least a long delay type tripping function coupled to the detection means, wherein the electronic processing unit produces a value representative of the current in response to the output signal generated by the detection means, produces a first quantity, representative of the thermal state of the circuit breaker, the variations of which are proportional to the difference between the square of the value representative of the current and the square of a preset current threshold, and compares the first quantity to a preset first threshold, and wherein the electronic processing unit increments a second quantity representative of the thermal state of the circuit breaker when the first quantity is greater than the first threshold, decrements the second quantity when the first quantity is lower than the first threshold, compares the second quantity to a second, preset threshold, and produces a tripping signal when the second quantity is greater than the second threshold; and
   tripping means for causing the circuit breaker to trip to an open circuit condition in response to the tripping signal generated by the electronic processing unit.

2. The trip device according to claim 1, wherein incrementation of the second quantity is proportional to the square of the value representative of the current and its decrementation is an exponential function of time.

3. The trip device according to claim 1, wherein the first quantity is limited to preset high and low levels.

4. The trip device according to claim 1, characterized in that the output signal from the detection means is sampled in successive groups of "n" samples with a preset sampling period (Te), the adjacent samples of two successive groups being separated by a period slightly greater than the sampling period.

5. The trip device according to claim 4, characterized in that the period separating adjacent samples of two successive groups is equal to the sampling period increased by a quarter of the sampling period.

6. The trip device according to claim 1, characterized in that the output signal from the detection means is sampled in successive groups of n samples with predetermined sampling periods (Te1-Te4), different for two successive groups.

7. The trip device according to claim 6, characterized in that the samples constitute cycles of q successive groups, with an identical succession of the sampling periods (Te1-Te4) within a cycle.

* * * * *